US012595205B2

(12) United States Patent
    Kashima et al.

(10) Patent No.: US 12,595,205 B2
(45) Date of Patent: Apr. 7, 2026

(54) GLASS SUBSTRATE, COVER GLASS, ASSEMBLY, ASSEMBLY MANUFACTURING METHOD, IN-VEHICLE DISPLAY DEVICE, AND IN-VEHICLE DISPLAY DEVICE MANUFACTURING METHOD

(71) Applicant: AGC Inc., Tokyo (JP)

(72) Inventors: Izuru Kashima, Tokyo (JP); Yusuke Fujiwara, Tokyo (JP)

(73) Assignee: AGC Inc., Tokyo (JP)

( * ) Notice: Subject to any disclaimer, the term of this patent is extended or adjusted under 35 U.S.C. 154(b) by 0 days.

(21) Appl. No.: 18/426,403

(22) Filed: Jan. 30, 2024

(65) Prior Publication Data

US 2024/0166560 A1    May 23, 2024

Related U.S. Application Data

(60) Division of application No. 17/646,793, filed on Jan. 3, 2022, now abandoned, which is a continuation of (Continued)

(30) Foreign Application Priority Data

Jul. 10, 2019    (JP) ................................. 2019-128183

(51) Int. Cl.
    *C03C 27/06*        (2006.01)
    *B32B 3/26*         (2006.01)
                        (Continued)

(52) U.S. Cl.
    CPC ................ *C03C 27/06* (2013.01); *B32B 3/26* (2013.01); *B32B 3/30* (2013.01); *B32B 7/08* (2013.01);
                        (Continued)

(58) Field of Classification Search
    CPC ......... C03C 27/06; C03B 23/023; B32B 3/26; B32B 3/30; B32B 7/08; B32B 17/06; B32B 2457/20; B32B 2605/00
                        (Continued)

(56) References Cited

U.S. PATENT DOCUMENTS

2016/0357294 A1    12/2016   Ozeki et al.
2018/0188869 A1    7/2018    Boggs et al.

FOREIGN PATENT DOCUMENTS

CN        106250800 A      12/2016
JP        2001-142194 A    5/2001
                        (Continued)

OTHER PUBLICATIONS

International Search Report issued Sep. 15, 2020 in PCT/JP2020/024908, filed on Jun. 24, 2020, 2 pages.
                        (Continued)

*Primary Examiner* — Catherine A. Simone
(74) *Attorney, Agent, or Firm* — Oblon, McClelland, Maier & Neustadt, L.L.P.

(57) ABSTRACT

A glass substrate includes a thin portion having a first surface and a second surface opposed to the first surface, a thick portion having a first surface and a second surface opposed to the first surface and having a sheet thickness $t_3$ that is larger than a sheet thickness $t_2$ of the thin portion, a connection portion having a first connection surface and a second connection surface, the first connection surface connecting the first surface of the thin portion to the first surface of the thick portion, the second connection surface connecting the second surface of the thin portion to the second surface of the thick portion. The first connection surface has a curvature radius of more than or equal to 400 $\mu$m.

8 Claims, 6 Drawing Sheets

Related U.S. Application Data application No. PCT/JP2020/024908, filed on Jun. 24, 2020.

(51) Int. Cl.

| | | |
|---|---|---|
| *B32B 3/30* | (2006.01) | |
| *B32B 7/08* | (2019.01) | |
| *B32B 17/06* | (2006.01) | |
| *B60K 35/22* | (2024.01) | |
| *B60K 35/50* | (2024.01) | |
| *B60K 35/60* | (2024.01) | |
| *C03B 23/023* | (2006.01) | |

(52) U.S. Cl.
 CPC .............. *B32B 17/06* (2013.01); *B60K 35/22* (2024.01); *B60K 35/50* (2024.01); *B60K 35/60* (2024.01); *C03B 23/023* (2013.01); *B32B 2457/20* (2013.01); *B32B 2605/00* (2013.01)

(58) Field of Classification Search
 USPC ......................................................... 428/156
 See application file for complete search history.

(56) References Cited

FOREIGN PATENT DOCUMENTS

| | | |
|---|---|---|
| JP | 2017-48090 A | 3/2017 |
| JP | 2019-26519 A | 2/2019 |
| WO | WO 2018/116981 A1 | 6/2018 |
| WO | WO 2018/213267 A1 | 11/2018 |

OTHER PUBLICATIONS

Extended European Search Report issued on Jul. 7, 2023 in European Application No. 20836936.3, 7 pages.

FIG. 11

GLASS SUBSTRATE, COVER GLASS, ASSEMBLY, ASSEMBLY MANUFACTURING METHOD, IN-VEHICLE DISPLAY DEVICE, AND IN-VEHICLE DISPLAY DEVICE MANUFACTURING METHOD

TECHNICAL FIELD

The present invention relates to a glass substrate, a cover glass, an assembly, a manufacturing method of an assembly, an in-vehicle display device, and a manufacturing method of an in-vehicle display device.

BACKGROUND ART

Conventionally, a glass substrate configured by connecting glass sheet portions having different sheet thicknesses to each other is used, for example, as a cover glass (FIG. 5 of Patent Literature 1).

CITATION LIST

Patent Literature

Patent Literature 1: International Publication WO2018/213267

SUMMARY OF INVENTION

Technical Problem

The glass substrate configured by connecting glass sheet portions having different sheet thicknesses to each other has, namely, a thin portion, a thick portion having a sheet thickness larger than that of the thin portion, and a connection portion connecting the thin portion and the thick portion.

Demands for assembling such a glass substrate to an uneven structure by elastically deforming the thin portion are anticipated.

Studies by the present inventors have revealed that depending on the shape of the connection portion of the glass substrate, it is difficult to bend the connection portion. In this case, a defect may occur in an assembly obtained by assembling the glass substrate to an uneven structure.

Accordingly, an object of the present invention is to provide a glass substrate ensuring easy bending of a connection portion connecting a thin portion and a thick portion.

Solution to Problem

As a result of intensive studies, the present inventors have found that the object above can be attained by employing the following configurations.

That is, the present invention relates to [1] to below.

[1] A glass substrate including a thin portion having a first surface and a second surface opposed to the first surface; a thick portion having a first surface and a second surface opposed to the first surface and having a sheet thickness $t_3$ that is larger than a sheet thickness $t_2$ of the thin portion; and a connection portion having a first connection surface and a second connection surface, the first connection surface connecting the first surface of the thin portion to the first surface of the thick portion, the second connection surface connecting the second surface of the thin portion to the second surface of the thick portion, wherein the first connection surface has a curvature radius of more than or equal to 400 μm.

[2] A glass substrate including a thin portion having a first surface and a second surface opposed to the first surface; a thick portion having a first surface and a second surface opposed to the first surface and having a sheet thickness $t_3$ that is larger than a sheet thickness $t_2$ of the thin portion; and a connection portion having a first connection surface and a second connection surface, the first connection surface connecting the first surface of the thin portion to the first surface of the thick portion, the second connection surface connecting the second surface of the thin portion to the second surface of the thick portion, wherein a sheet thickness $t_4$ that is a sheet thickness of the thinnest portion in the connection portion is thinner than the sheet thickness $t_2$ of the thin portion.

[3] The glass substrate according to [2] above, wherein the sheet thickness $t_4$ of the connection portion is less than or equal to 0.5 mm.

[4] The glass substrate according to any one of [1] to [3] above, wherein the sheet thickness $t_2$ of the thin portion is 0.05 mm or more and 0.8 mm or less, and the sheet thickness $t_3$ of the thick portion is 0.5 mm or more and 2.5 mm or less.

[5] The glass substrate according to any one of [1] to [4] above, wherein the connection portion includes an overhang part.

[6] The glass substrate according to any one of [1] to [5] above, wherein the glass substrate is a chemically strengthened glass.

[7] A cover glass including the glass substrate according to any one of [1] to [6] and configured to cover a display panel.

[8] An assembly including an uneven structure; and the glass substrate according to any one of [1] to [6] that is assembled to the uneven structure, wherein the thin portion of the glass substrate is assembled to the uneven structure with the thin portion elastically deformed according to a shape of the uneven structure.

[9] A method of manufacturing an assembly, the method comprising assembling the glass substrate according to any one of [1] to [6] to an uneven structure, wherein the thin portion of the glass substrate is elastically deformed according to a shape of the uneven structure and assembled to the uneven structure.

[10] An in-vehicle display device including: an instrument cluster provided in front of a driving seat; a center information display provided in front of an area between the driving seat and a passenger seat; and the glass substrate according to any one of [1] to [6], wherein the instrument cluster includes an uneven structure, wherein the thin portion of the glass substrate is assembled to the uneven structure with the thin portion elastically deformed according to a shape of the uneven structure, and wherein the thick portion of the glass substrate is assembled to the center information display.

[11] A method of manufacturing an in-vehicle display, the method including assembling the glass substrate according to any one of [1] to [6] to an instrument cluster provided in front of a driving seat and a center information display provided in front of an area between the driving seat and a passenger seat, wherein the instrument cluster includes uneven structure, wherein the thin portion of the glass substrate is elastically deformed according to a shape of the uneven structure and assembled to the uneven structure, and wherein the thick portion of the glass substrate is assembled to the center information display.

Advantageous Effects of Invention

According to the present invention, a glass substrate ensuring easy bending of a connection portion connecting a thin portion and a thick portion is obtained.

BRIEF DESCRIPTION OF DRAWINGS

FIG. 11 is a cross-sectional diagram for explaining how to determine the curvature radius of the first connection surface and the curvature radius of the overhang surface.

DESCRIPTION OF EMBODIMENTS

Figure 1:
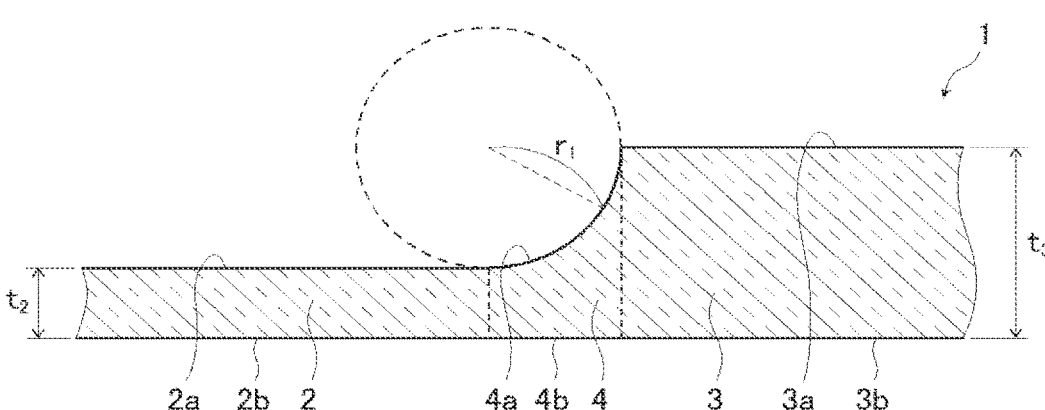
FIG. 1 is a cross-sectional diagram illustrating a glass substrate according to a first embodiment.

One embodiment of the present invention is described below by referring to the drawings. However, the present invention is not limited to the following embodiments. Various modifications and substitutions can be made to the following embodiments without departing from the scope of the present invention.

The range expressed using "to" includes both ends of the range. For example, the range expressed as "A to B" includes A and B.

The sheet thickness (average sheet thickness) of glass is determined by the measurement using a micrometer.

The way of determining the curvature radius of a curved surface of glass is described later (described by referring to FIG. 11).

The compressive stress value (CS) of the compressive stress layer of glass and the depth of the compressive stress layer (DOL) are determined by the measurement using a surface stress meter (FSM-6000) manufactured by Orihara Industrial Co., Ltd.

The internal tensile stress (CT) of glass is determined from CS, DOL and sheet thickness t according to the following formula:

$$CT=CS[MPa]\times DOL[mm]/(t[mm]-2\times DOL[mm])$$

The limit bend radius of glass is a minimum bend radius at which cracks are not generated when curving the glass, and the bend radius is determined by the following bending test. The bending test and the bending test apparatus used for the bending test are in conformity with the test and apparatus described in International Publication WO2016/194785.

(Bending Test)

A first support board and a second support board are disposed in parallel by arranging the support surface of the first support board to face the support surface of the second support board with each other. Edges of the glass are supported by the first support board and the second support board, respectively. The distance between the support surface of the first support board and the support surface of the second support board is set to a state that maintains a distance D [mm] determined according to the following formula (1). In this state, the position of the second support board relative to the first support board is moved back-and-forth by 100 mm in parallel to the support surface of the first support board and the support surface of the second support board and in a direction not involving a change in the curvature direction of the glass. Whether or not a crack is formed in the glass to be curved between the first support board and the second support board is examined. The bend radius R is determined according to the following formula (2).

$$D=(A\times E\times t/\sigma)+t \quad (1)$$

$$R=D/2 \quad (2)$$

$$R/t=\frac{1}{2}(A\times E/\sigma+1) \quad (3)$$

D: Distance [mm] between the support surface of the first support board and the support surface of the second support board.

A=1.198

E: Young's modulus of the glass [MPa]

t: Sheet thickness [mm] of the glass

σ: Bending stress [MPa]

The surface strength of the glass sheet is determined by the ball-on-ring (BOR) test described below.

(Ball-On-Ring Test)

First, a glass sheet is horizontally disposed on a stainless steel-made ring. As for the ring, the diameter is 30 mm, and the curvature radius of the contact portion with the glass sheet is 2.5 mm.

Next, a sphere composed of steel having a diameter of 10 mm is brought into contact with the glass sheet disposed on the ring, at the center position of the ring.

In this state, the sphere is caused to descend and pressed against the glass sheet (descent rate of sphere: 1.0 mm/min), and a static load is thereby applied to the glass sheet to fracture the glass sheet.

The load at which the glass sheet is fractured is measured, and an average value of 20 measurements is used as the surface strength of the glass sheet. However, in the case where the fracture origin of the glass sheet is 2 mm or more apart from the sphere-pressing position, the value is excluded from the measured values for calculating the average value.

First Embodiment

A first embodiment is described by referring to FIG. 1 to FIG. 6.

Figure 2:
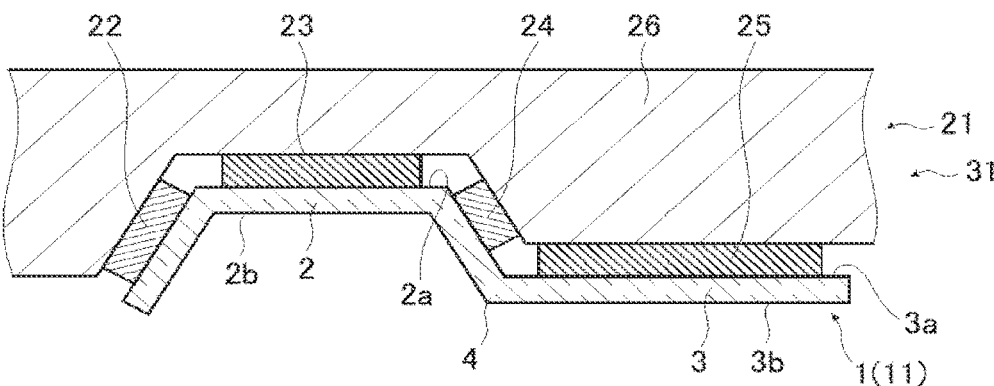
FIG. 2 is a schematic diagram illustrating an assembly obtained by assembling the glass substrate according to the first embodiment to an uneven structure.
Figure 3:
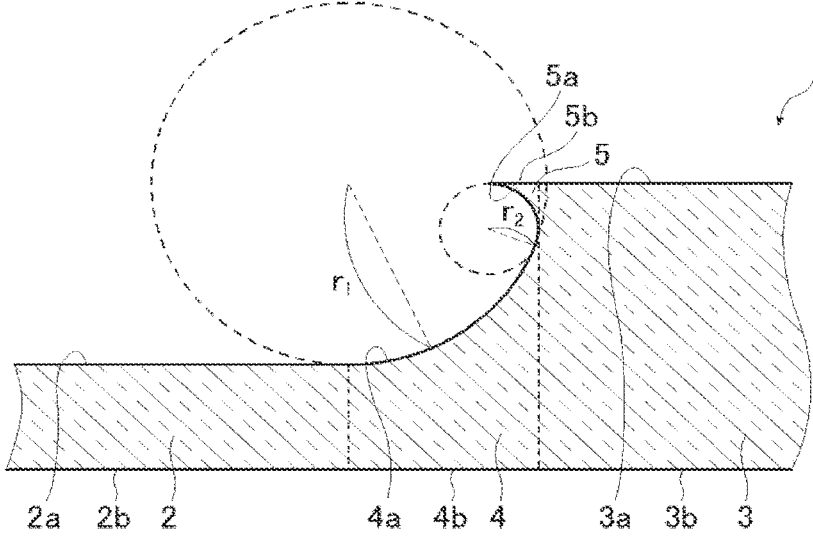
FIG. 3 is a cross-sectional diagram illustrating a modification example of the glass substrate according to the first embodiment.

First, a glass substrate according to the first embodiment is described by referring to FIG. 1 to FIG. 3.

<Glass Substrate>

FIG. 1 is a cross-sectional diagram illustrating a glass substrate 1 according to the first embodiment.

The glass substrate 1 has a thin portion 2, a thick portion 3, and a connection portion 4.

The thin portion 2 has a first main surface 2a and a second main surface 2b opposing the first main surface 2a.

The thick portion 3 has a first main surface 3a and a second main surface 3b opposing the first main surface 3a.

The sheet thickness $t_3$ of the thick portion 3 is larger than the sheet thickness $t_2$ of the thin portion 2.

The connection portion 4 has a first connection surface 4a and a second connection surface 4b. The first connection surface 4a connects the first main surface 2a of the thin portion 2 and the first main surface 3a of the thick portion 3. The second connection surface 4b connects the second main surface 2b of the thin portion 2 and the second main surface 3b of the thick portion 3. In the glass substrate 1 according to the first embodiment in the state of being not elastically deformed, the second main surface 2b of the thin portion 2, the second connection surface 4b of the connection portion 4, and the second main surface 3b of the thick portion 3 lie flush with each other.

FIG. 2 is a schematic diagram illustrating an assembly 31 obtained by assembling the glass substrate 1 according to the first embodiment to an uneven structure 21.

The uneven structure 21 has, for example, a display panel 22, a display panel 23, a display panel 24, and a display panel 25, and these panels are held in a panel holding section 26 having an uneven shape.

More specifically, three panels, i.e., display panel 22, display panel 23 and display panel 24, are disposed in a recessed manner, and one panel, i.e., display panel 25, is disposed in a protruded position.

Each display panel is, for example, a liquid crystal panel. In this case, a backlight unit is disposed on a back surface side of each liquid crystal panel. Each display panel may be, for example, an organic EL panel, PDP, an electronic ink-type panel, etc. The display panel may have a touch panel, etc.

The glass substrate 1 is assembled to such an uneven structure 21.

More specifically, for example, the first main surface 3a of the thick portion 3 of the glass substrate 1 is bonded to the display panel 25 via OCA (Optical Clear Adhesive) (not shown). Furthermore, while elastically deforming the thin portion 2 of the glass substrate 1 in a recessed manner, the first main surface 2a of the elastically deformed thin portion 2 is bonded to the display panel 22, the display panel 23 and the display panel 24 via OCA (not shown). That is, the thin portion 2 of the glass substrate 1 is assembled in an elastically deformed state to the uneven structure 21 along the shape of the uneven structure 21. In this way, an assembly 31 is obtained.

In the assembly 31, the glass substrate 1 functions as a cover glass for covering each display panel. That is, the cover glass is composed of the glass substrate 1 and covers each display panel. In the case where the glass substrate 1 is used as a cover glass, the glass is preferably a chemical strengthening-treated glass (chemically strengthened glass).

The assembly 31 is, for example, a display device, and specific examples thereof include an in-vehicle display device that is mounted on a vehicle and used.

More specifically, the display device includes an in-vehicle display device having an instrument cluster (cluster)

disposed in front of a driving seat and a center information display (CID) disposed in the front between the driving seat and a passenger seat.

For example, in the assembly 31 as an in-vehicle display device, a portion where the display panel 22, the display panel 23 and the display panel 24 are disposed in a recessed manner is the cluster. That is, the cluster has an uneven structure 21. On the other hand, a portion where the display panel 25 is disposed is CID. In this case, the thin portion 2 is used as a cover glass of the cluster, and the thick portion 3 is used as a cover glass of CID.

The thick portion 3 used as a cover glass of CID is absent from a handle operated by a driver and therefore, is likely to be hit directly by the head of an occupant when vehicle crash occurs. For this reason, the thick portion 3 preferably has impact resistance high enough to prevent breaking due to hitting by the head of an occupant upon occurrence of vehicle crash.

In the case of elastically deforming the thin portion 2 of the glass substrate 1 as illustrated in FIG. 2, bending of the connection portion 4 of the glass substrate 1 is required At this time, if the connection portion 4 is difficult to bend (bending of the connection portion 4 is insufficient), the first main surface 2a of the thin portion 2 and the display panel 24 are likely to be debonded from each other, and a trouble may occur in an assembly 31.

However, in the glass substrate 1, the curvature radius $r_1$ of the first connection surface 4a illustrated in FIG. 1 is 400 μm or more. This facilitates bending of the connection portion 4.

Furthermore, in the case where, for example, a film such as OCA is adhered to the first connection surface 4a, even if an air bubble enters between the first connection surface 4a and the film, an effect of making it easy for the air bubble to escape may also be expected. For the reason that this effect is more excellent, the curvature radius $r_1$ of the first connection surface 4a is preferably 550 μm or more, more preferably 700 μm or more.

On the other hand, although the upper limit is not particularly limited, the curvature radius $r_1$ of the first connection surface 4a is preferably 1,300 μm or less, more preferably 1,100 μm or less, still more preferably 900 μm or less.

<<Thin Portion>>

The thin portion 2 has a first main surface 2a and a second main surface 2b.

The sheet thickness $t_2$ of the thin portion 2 is preferably 0.05 mm or more, more preferably 0.2 mm or more. On the other hand, the sheet thickness $t_2$ of the thin portion 2 is preferably 0.8 mm or less, more preferably 0.6 mm or less.

The compressive stress value (CS) of the compressive stress layer of the thin portion 2 is preferably 500 MPa or more, more preferably 650 MPa or more, still more preferably 750 MPa or more.

The depth of the compressive stress layer (DOL) of the thin portion 2 is preferably 10 μm or more, more preferably 15 μm or more, still more preferably 25 μm or more.

The internal tensile stress (CT) of the thin portion 2 is preferably 160 MPa or less, more preferably 140 MPa or less. On the other hand, the internal tensile stress (CT) of the thin portion 2 is preferably 20 MPa or more, more preferably 30 MPa or more.

The limit bend radius of the thin portion 2 is preferably 60 mm or less, more preferably 50 mm or less, still more preferably 40 mm or less.

<<Thick Portion>>

The thick portion 3 has a first main surface 3*a* and a second main surface 3*b*.

The sheet thickness $t_3$ of the thick portion 3 is preferably 0.5 mm or more, more preferably 0.7 mm or more. On the other hand, the sheet thickness $t_3$ of the thick portion 3 is preferably 2.5 mm or less, more preferably 2.0 mm or less. When the sheet thickness $t_3$ of the thick portion 3 is in this range, the thick portion 3 enjoys excellent impact resistance.

For the reason that the thick portion 3 has excellent impact resistance, the compressive stress value (CS) of the compressive stress layer of the thick portion 3 is preferably 500 MPa or more, more preferably 650 MPa or more, still more preferably 750 MPa or more.

For the reason that the thick portion 3 has excellent impact resistance, the depth of the compressive stress layer (DOL) of the thick portion 3 is preferably 10 μm or more, more preferably 15 μm or more, still more preferably 25 μm or more.

For the reason that the thick portion 3 has excellent impact resistance, the internal tensile stress (CT) of the thick portion 3 is preferably 50 MPa or less, more preferably 30 MPa or less. On the other hand, the internal tensile stress (CT) of the thick portion 3 is preferably 1 MPa or more, more preferably 5 MPa or more.

For the reason that the thick portion 3 has excellent impact resistance, the surface strength of the thick portion 3 is preferably 150 kgf or more, more preferably 200 kgf or more, still more preferably 250 kgf or more.

The number density (unit: pieces/(5 cm×5 cm)) of broken pieces having an area of 25 mm² or more (hereinafter, sometimes simply referred to as "broken pieces") of the thin portion 2 and that of the thick portion 3 are preferably different from each other, and it is more preferred that there is a clear difference therebetween. The number density means the number of broken pieces having an area of 25 mm² or more (hereinafter, sometimes simply referred to as "broken pieces") in unit area (5 cm×5 cm) when the glass is broken.

Specifically, the difference in the number density of broken pieces between the thin portion 2 and the thick portion 3 is preferably 0.1 pieces/(5 cm×5 cm) or more, more preferably 1 piece/(5 cm×5 cm) or more, still more preferably 5 pieces/(5 cm×5 cm) or more, yet still more preferably 7 pieces/(5 cm×5 cm) or more.

When the difference in the number density of broken pieces is in this range, a break becomes discontinuous between the thin portion 2 and the thick portion 3 and even if the thin portion 2 is broken, spread of the break to the thick portion 3 can be reduced.

The number of broken pieces may be larger in the thin portion 2 than in the thick portion 3. In this case, there is a technical meaning that when an impact acts on the thin portion 2 and the thin portion 2 is broken, propagation of a crack from the thin portion 2 to the thick portion 3 is reduced.

That is, it is preferable that the number of broken pieces is larger in the thin portion 2 than in the thick portion 3, since propagation of a crack from the thin portion 2 to the thick portion 3 is suppressed in the connection portion 4. Specifically, per 30 cm length of the connection portion 4, propagation of one or more cracks is preferably suppressed, and it is more preferred that propagation of three or more cracks is suppressed.

The number density of broken pieces is determined as follows.

First, each of the thin portion 2 and the thick portion 3 is subjected to a head impact test.

More specifically, in the same manner as in the descriptions of paragraphs [0081] to [0088] of JP-A-2019-64874, a test specimen using the thin portion 2 or thick portion 3 as a cover glass is prepared, and a rigid model is caused to collide against it.

The collision position of the rigid model is the center position of the main surface of the cover glass, and the rigid model is caused to collide from a direction perpendicular to the main surface.

In the case where the cover glass is not broken by the collision with the rigid model, the height of the rigid model is raised by 5 cm, and the rigid model is again caused to collide against the cover glass. This operation is repeated until the cover glass is broken. When the cover glass is broken, the number and area of broken pieces in a region 10 cm or more apart from the collision position of the rigid model are measured, and from these, the number density of broken pieces is determined.

The size or number density of broken pieces can be adjusted by adjusting the conditions of the later-described chemical strengthening treatment. For example, at the time of cooling the glass sheet after immersing it in a molten salt, cooling is accelerated only in a portion serving as the thin portion 2 or only in a portion serving as the thick portion 3. This technique, etc. enables precise control of the size or number density of broken pieces.

For the reason that the breaking strength of the thick portion 3 is maintained, the ratio of CT of the thin portion 2 to CT of the thick portion 3 (thin portion/thick portion) is preferably 1.1 or more, more preferably 1.5 or more, still more preferably 3.0 or more.

On the other hand, for the reason that the breaking strength of the thin portion 2 is maintained, the ratio of CT of the thin portion 2 to CT of the thick portion 3 (thin portion/thick portion) is preferably 20 or less, more preferably 10 or less, still more preferably 7 or less.

<<Connection Portion>>

The connection portion 4 has a first connection surface 4*a* and a second connection surface 4*b*.

The curvature radius $r_1$ of the first connection surface 4*a* is as described above. That is, the curvature radius $r_1$ of the first connection surface 4*a* is 400 μm or more, preferably 550 μm or more, more preferably 700 μm or more. On the other hand, the curvature radius $r_1$ of the first connection surface 4*a* is preferably 1,300 μm or less, more preferably 1,100 μm or less, still more preferably 900 μm or less.

The second connection surface 4*b* is a projection plane when the first connection surface 4*a* is projected in a direction parallel to the sheet thickness direction.

Propagation of a crack from the thin portion 2 to the thick portion 3 can be increased or decreased by adjusting the sheet thickness $t_4$ of the connection portion 4. As the sheet thickness $t_4$ of the connection portion 4 is decreased, propagation of a crack over the connection portion 4 can be suppressed. Specifically, the sheet thickness $t_4$ of the connection portion 4 is preferably 0.5 mm or less, more preferably 0.3 mm or less, still more preferably 0.2 mm or less.

From the viewpoint that the glass substrate 1 is not easily broken during transport or attachment, the sheet thickness $t_4$ of the connection portion 4 is preferably 0.05 mm or more, more preferably 0.07 mm or more, still more preferably 0.1 mm or more.

The sheet thickness $t_4$ of the connection portion 4 is a sheet thickness of the thinnest portion in the connection portion 4.

FIG. 3 is a cross-sectional diagram illustrating a modification example of the glass substrate 1 according to the first embodiment.

As illustrated in FIG. 3, the glass substrate 1 may have an overhang part 5.

The overhang part 5 is part of the connection portion 4 and is a region protruding toward the thin portion 2 from the thick portion 3. The overhang part 5 has an overhang surface 5a that is part of the first connection surface 4a of the connection portion 4 and a surface 5b that is flush with the first main surface 3a of the thick portion 3.

For the reason that when the glass substrate 1 is seen from the first main surface 2a and first main surface 3a side, the boundary portion between the thin portion 2 and the thick portion 3 is sharply recognized and this is preferred from the viewpoint of external appearance, the curvature radius $r_2$ of the overhang surface 5a illustrated in FIG. 3 is preferably 150 μm or more, more preferably 300 μm or more. On the other hand, for the reason that the connection portion 4 is protected and thereby rendered resistant to breaking during transport or processing of the glass substrate 1, the curvature radius $r_2$ of the overhang surface 5a is preferably 1,100 μm or less, more preferably 900 μm or less.

Figure 11:
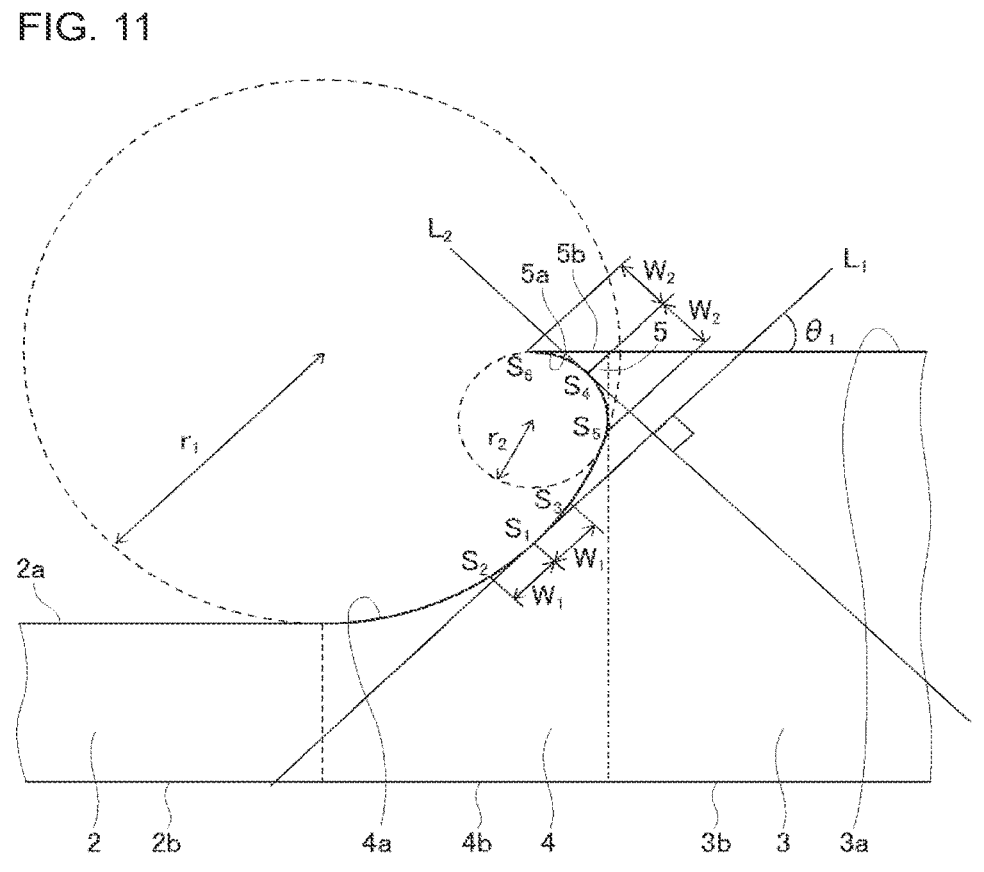

FIG. 11 is a cross-sectional diagram for explaining the way of determining the curvature radius $r_1$ of the first connection surface 4a and the curvature radius 12 of the overhang surface 5a. FIG. 11 is substantially an enlarged diagram of FIG. 3.

The way of determining the curvature radius $r_1$ and the curvature radius $r_2$ is described below by referring to FIG. 11.

The curvature radius $r_1$ of the first connection surface 4a of the connection portion 4 is determined as follows.

First, consider a straight light $L_1$ that is inclined in a direction extending from the first main surface 3a of the thick portion 3 to the second connection surface 4b of the connection portion 4 and intersects with the first main surface 3a of the thick portion 3 at an angle $\theta_1$ (=45°).

The straight line $L_1$ is moved in a direction toward the connection portion 4 from the thick portion 3 and when the straight line $L_1$ first contacts at one point with the first connection surface 4a, the contact point is designated as point $S_1$.

Next, a point spaced from the point $S_1$ by a length $W_1$ (=10 μm) along the straight line $L_1$ and located on the first connection surface 4a is designated as point $S_2$. Likewise, a point spaced opposite to the point $S_2$ from the point $S_1$ along the straight line $L_1$ by a length $W_1$ (=10 μm) and located on the first connection surface 4a is designated as point $S_3$.

The radius of a true circle passing through point $S_1$, point $S_2$ and point $S_3$ is used as the curvature radius $r_1$ of the first connection surface 4a of the connection portion 4.

The curvature radius $r_2$ of the overhang surface 5a of the overhang part 5 is determined as follows.

First, consider a straight light $L_2$ orthogonally intersecting the straight line $L_1$.

The straight line $L_2$ is moved in a direction toward the overhang part 5 from the thick portion 3 and when the straight line $L_2$ first contacts at one point with the overhang surface 5a, the contact point is designated as point $S_4$.

Next, a point spaced from the point $S_4$ by a length $W_2$ (=10 μm) along the straight line $L_2$ toward the thick portion 3 side and located on the overhang surface 5a is designated as point $S_5$. A point spaced opposite to the point $S_5$ from the point $S_4$ along the straight line $L_2$ by a length $W_2$ (=10 μm) and located at a position axisymmetric with the point $S_5$ is designated as point $S_6$. The point $S_6$ may or may not be a point on the overhang surface 5a.

The radius of a true circle passing through point $S_4$, point $S_5$ and point $S_6$ is used as the curvature radius $r_2$ of the overhang surface 5a of the overhang part 5.

<Manufacturing Method of Glass Substrate>

Figure 4:
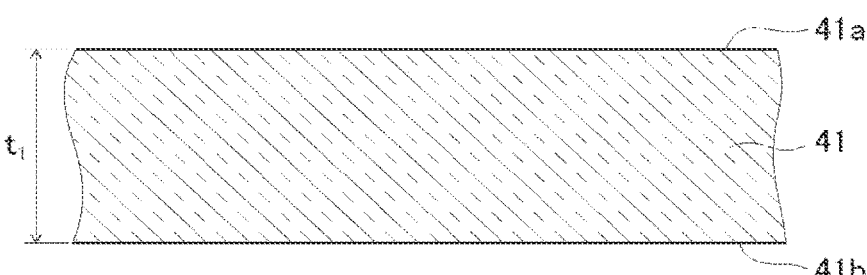
FIG. 4 is a cross-sectional diagram illustrating a glass sheet.
Figure 5:
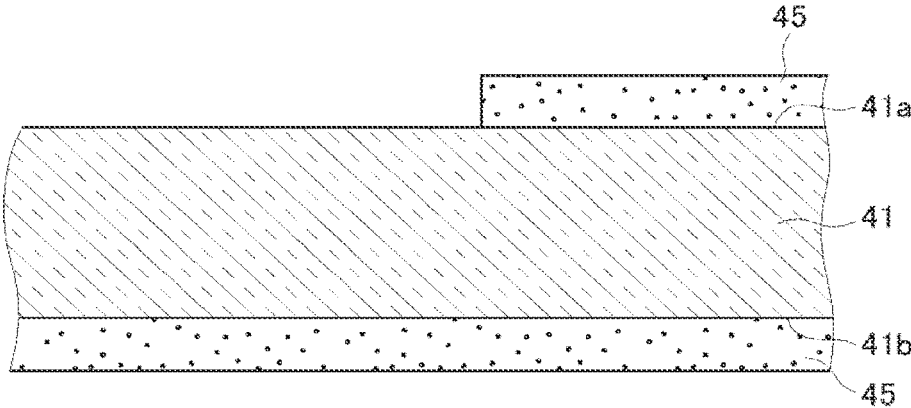
FIG. 5 is a cross-sectional diagram illustrating a glass sheet covered by a mask material.
Figure 6:
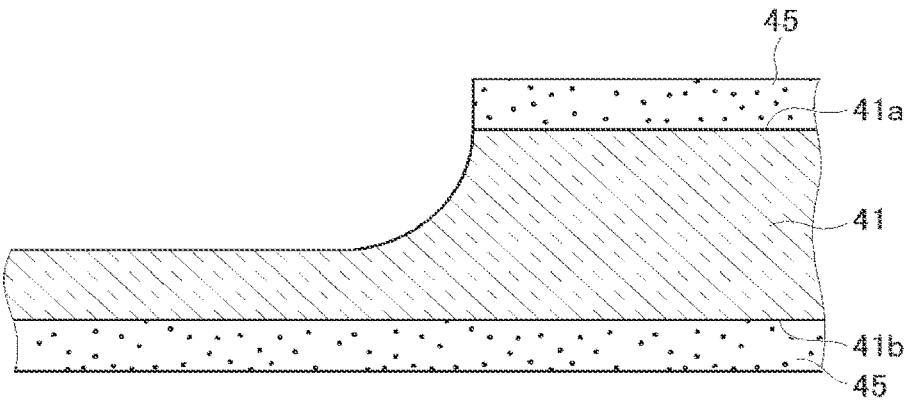
FIG. 6 is a cross-sectional diagram illustrating a glass sheet after etching.

The method for manufacturing the glass substrate 1 according to the first embodiment is described by referring to FIG. 4 to FIG. 6.

<<Preparation of Glass Sheet>>

FIG. 4 is a cross-sectional diagram illustrating a glass sheet 41.

First, as illustrated in FIG. 4, a glass sheet 41 is prepared.

The glass species of the glass sheet 41 includes, for example, soda lime glass, aluminosilicate glass ($SiO_2$—$Al_2O_3$—$Na_2O$-based glass), etc. The glass composition of the glass sheet 41 includes, for example, a glass composition described in paragraph of JP-A-2019-006650. In the case of applying the later-described chemical strengthening treatment, for example, a glass for chemical strengthening based on aluminosilicate glass (for example, "Dragontrail (registered trademark)") is suitably used.

The sheet thickness $t_1$ of the glass sheet 41 is the same as the sheet thickness $t_3$ of the thick portion 3 of the glass substrate 1, because, as described later, part of the glass sheet 41 is not subjected to slimming but is maintained and serves as the thick portion 3.

The glass sheet 41 has a first main surface 41a and a second main surface 41b. The sizes of the first main surface 41a and second main surface 41b are appropriately set.

<<Slimming>>

The prepared glass sheet 41 is subjected to slimming. The slimming includes the below-described masking and etching.

(Masking)

FIG. 5 is a cross-sectional diagram illustrating a glass sheet 41 covered by a mask material 45.

As illustrated in FIG. 5, part of the first main surface 41a of the glass sheet 41 is covered by a mask material 45. More specifically, out of the first main surface 41a of the glass sheet 41, a surface serving as the first main surface 3a of the thick portion 3 is covered by a mask material 45.

Furthermore, as illustrated in FIG. 5, the entire surface of the second main surface 41b of the glass sheet 41 is covered by the mask material 45.

The material of the mask material 45 is not particularly limited as long as it is a material resistant to the later-described etchant, and a conventional known material may be appropriately selected and used.

The mask material 45 includes, for example, a film-like mask material, and specific suitable examples thereof include an acid-resistant PET (polyethylene terephthalate) coated with an acrylic pressure-sensitive adhesive.

The mask material 45 may also be formed by applying a curable resin to the glass sheet 41 by means of a bar coater, etc., and curing the curable resin. The curable resin includes, for example, a UV-curable resin and a thermosetting resin. The UV-curable resin includes, for example, an acrylate-based radical polymerization resin and an epoxy-based cationic polymerization resin. The thermosetting resin includes, for example, an epoxy resin, a phenolic resin, a urea resin, a melamine resin, an unsaturated polyester resin, a polyurethane resin, a diallyl phthalate resin, a silicone resin, and an alkyd resin. The UV-curing resin is preferred because of its high curing rate.

As the mask material 45, it is also possible to form a resist pattern on the first main surface 41a of the glass sheet 41. In this case, first, a resist coating material is applied as a coating on the first main surface 41a of the glass sheet 41 to obtain a resist film. The obtained resist film is exposed through a photomask having a pattern with a desired shape. The resist film after exposure is developed to form a resist pattern.

(Etching)

FIG. 6 is a cross-sectional diagram illustrating the glass sheet 41 after etching.

The glass sheet 41 covered by the mask material 45 is etched using an etchant. Consequently, as illustrated in FIG. 6, part of the portion not covered by the mask material 45 in the glass sheet 41 dissolves in the etchant.

Dissolution gradually proceeds from the first main surface 41a not covered by the mask material 45 toward the second main surface 41b. In this way, a portion serving as the thin portion 2 is formed.

Because of etching using an etchant, a smooth etching surface (curved surface) is formed. Thus, a portion serving as the connection portion 4 having a first connection surface 4a with a specific curvature radius $r_1$ is formed. At this time, when dissolution by etching excessively proceeds, a portion serving as the overhang part 5 (see, FIG. 3) is formed.

The portion that is maintained without being dissolved serves as the thick portion 3.

The etchant includes an aqueous solution containing an acid. Examples of the acid include, for example, hydrogen fluoride (HF), sulfuric acid, nitric acid, hydrochloric acid, hexafluorosilicate, etc., with hydrogen fluoride being preferred.

The content of the acid such as hydrogen fluoride in the etchant is preferably from 2 to 10 mass %.

When the content is 2 mass % or more, the processing time by etching is relatively shortened, and processing with good productivity is facilitated. On the other hand, when the content is 10 mass % or less, variation in the etching rate is suppressed, and uniform processing is likely to be performed. For the reason that these effects are more excellent, the content is more preferably from 4 to 8 mass %.

For the reason that variation in the etching rate is suppressed and uniform processing is likely to be performed, the temperature of the etchant is preferably from 10 to 40° C., more preferably from 20 to 30° ° C.

The method for etching is not particularly limited, but a method in which the glass sheet 41 covered by the mask material 45 is immersed in the etchant is preferred.

The immersion time in the etchant (etching time) is appropriately changed according to the sheet thickness $t_1$ of the glass sheet 41. For example, when the sheet thickness $t_1$ of the glass sheet 41 is 0.5 mm or more and 2.5 mm or less, the etching time is preferably 7 minutes or more, more preferably 10 minutes or more, still more preferably 15 minutes or more, and, on the other hand, is preferably 100 minutes or less, more preferably 60 minutes or less.

So-called wet etching using an etchant is described here, but as long as the above-described shape can be obtained, dry etching using, for example, a fluorine gas may also be employed.

After the etching, the mask material 45 is appropriately removed by a known method.

<<Chemical Strengthening Treatment>>

The glass sheet 41 after slimming may be subjected to a chemical strengthening treatment.

In the case of applying a chemical strengthening treatment, a glass for chemical strengthening is used as the glass sheet 41.

In the chemical strengthening treatment, a conventionally known method can be employed and, typically, the glass sheet 41 is immersed in a molten salt. As a result, in the surface layer of the glass sheet 41, alkali ions (Li ions and/or Na ions) are ion-exchanged (replaced) with other alkali ions having a large ionic radius (Na ions and/or K ions) in the molten salt. Through this ion exchange, a layer (compressive stress layer) in which a compressive stress is generated due to densification is formed in the surface layer of the glass sheet 41. In this way, the glass sheet 41 can be strengthened.

The treatment conditions such as temperature of and immersion time in molten salt may be set such that the compressive stress value (CS) of the compressive stress layer and the depth of the compressive stress layer (DOL) show a desired value.

For example, the temperature of the molten salt is not particularly limited as long as it is a glass strain point (usually from 500 to 600° C.), and the temperature is preferably 350° C. or more, more preferably 400° C. or more, still more preferably 430° ° C. or more.

The immersion time in the molten salt is preferably from 1 to 480 minutes, more preferably from 5 to 240 minutes, still more preferably from 10 to 120 minutes.

In the case where alkali ions contained in the glass sheet 41 are Na ions, the molten salt (inorganic salt composition) preferably contains potassium nitrate ($KNO_3$).

The molten salt may further contain at least one salt (flux) selected from the group consisting of $K_2CO_3$, $Na_2CO_3$, $KHCO_3$, $NaHCO_3$, $K_3PO_4$, $Na_3PO_4$, $K_2SO_4$, $Na_2SO_4$, KOH and NaOH.

The content of the flux in the molten salt is preferably 0.1 mol % or more, more preferably 0.5 mol % or more, still more preferably 1 mol % or more, yet still more preferably 2 mol % or more. On the other hand, in the case where $K_2CO_3$ is used as the flux, the content is preferably 24 mol % or less, more preferably 12 mol % or less, still more preferably 8 mol % or less.

The molten salt may further contain other chemical species to the extent of not inhibiting the effects of the present invention, and examples thereof include an alkali chloride salt such as sodium chloride and potassium chloride; an alkali borate salt such as sodium borate and potassium borate; etc.

After the immersion in the molten salt, the glass sheet 41 is pulled up from the molten salt and cooled.

After the chemical strengthening treatment is applied, the glass sheet 41 may be washed with industrial water, ion-exchanged water, etc.

<<Chemical Treatment>>

The glass sheet 41 subjected to the chemical strengthening treatment may be further subjected to a chemical treatment. The chemical treatment includes the below-described acid treatment and alkali treatment.

Between an acid treatment and an alkali treatment and after an alkali treatment, the glass sheet 41 may be washed with industrial water, ion-exchanged water, etc.

(Acid Treatment)

The acid treatment is a treatment of immersing the glass sheet 41 subjected to the chemical strengthening treatment in an acidic solution. Through this treatment, Na and/or K in the surface of the glass sheet 41 subjected to the chemical strengthening treatment is replaced with H. More specifically, the surface layer of the compressive stress layer in the glass sheet 41 subjected to the chemical strengthening treatment is modified and serves as a density-reduced low density layer.

The acid contained in the acidic solution (for example, an aqueous solution with a pH of less than 7) may be a weak acid or a strong acid. Specific examples of the acid include hydrochloric acid, nitric acid, sulfuric acid, phosphoric acid, acetic acid, oxalic acid, carbonic acid, citric acid, etc. One of these may be used alone, or two or more thereof may be used in combination. The concentration of the acid contained in the acidic solution is preferably from 0.1 to 20 mass %.

The temperature of the acidic solution is preferably 100° C. or less.

In view of productivity, the time for which the acid treatment is applied is preferably from 10 seconds to 5 hours, more preferably from 1 minute to 2 hours.

(Alkali Treatment)

The alkali treatment is a treatment of immersing the glass sheet 41 subjected to the acid treatment, in a basic solution. Through this treatment, a part or whole of the low density layer formed by the acid treatment is removed. In this way, cracks or latent damages present in the surface of the glass sheet 41 are removed together with the low density layer.

The base contained in the basic solution (for example, an aqueous solution with a pH of more than 7) may be a weak base or a strong base. Specific examples of the base include sodium hydroxide, potassium hydroxide, potassium carbonate, sodium carbonate, etc., and one of these may be used alone, or two or more thereof may be used in combination.

In view of removability, the concentration of the base contained in the basic solution is preferably from 0.1 to 20 mass %.

The temperature of the basic solution is preferably from 0 to 100° C., more preferably from 10 to 80° C., still more preferably from 20 to 60° C.

In view of productivity, the time for which the alkali treatment is applied is preferably from 10 seconds to 5 hours, more preferably from 1 minute to 2 hours.

In the case of not applying the chemical strengthening treatment and the chemical treatment, the glass sheet 41 where the mask material 45 is removed after slimming serves as the glass substrate 1.

In the case of not applying the chemical treatment after the chemical strengthening treatment, the glass sheet 41 subjected to the chemical strengthening treatment serves as the glass substrate 1.

In the case of applying the chemical treatment after the chemical strengthening treatment, the glass sheet 41 subjected to the chemical treatment serves as the glass substrate 1.

Second Embodiment

A second embodiment is described by referring to FIG. 7 to FIG. 10.

In FIG. 7 to FIG. 10, the same parts as those in the first embodiment are indicated by like reference signs, and descriptions thereof are omitted. First, a glass substrate according to the second embodiment is described by referring to FIG. 7.

<Glass Substrate>

Figure 7:
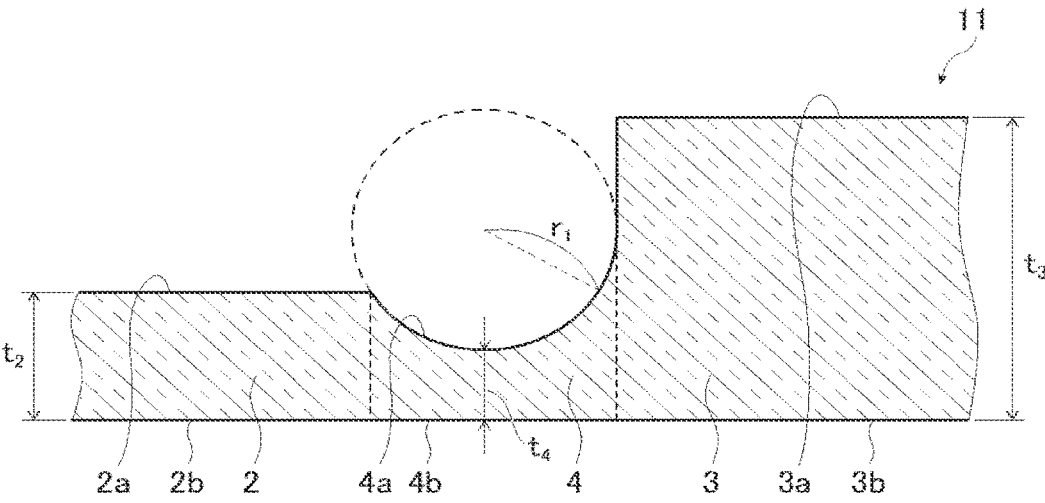
FIG. 7 is a cross-sectional diagram illustrating a glass substrate according to a second embodiment.

FIG. 7 is a cross-sectional diagram illustrating a glass substrate 11 according to the second embodiment.

The sheet thickness of the thinnest portion in the connection portion 4 is used as the sheet thickness $t_4$ of the connection portion 4. In the glass substrate 11, the sheet thickness $t_4$ of the connection portion 4 is smaller than the sheet thickness $t_2$ of the thin portion 2. This makes it easy to bend the connection portion 4.

For the reason that this effect is more excellent and, as described above, propagation of a crack over the connection portion 4 can be suppressed, the sheet thickness $t_4$ of the connection portion 4 is preferably 0.5 mm or less, more preferably 0.3 mm or less, still more preferably 0.2 mm or less.

On the other hand, the lower limit of the sheet thickness $t_4$ of the connection portion 4 is not particularly limited and is preferably 0.05 mm or more, more preferably 0.1 mm or more.

In the glass substrate 11 according to the second embodiment in the state of being not elastically deformed, the second main surface 2b of the thin portion 2, the second connection surface 4b of the connection portion 4, and the second main surface 3b of the thick portion 3 lie flush with each other.

<Manufacturing Method of Glass Substrate>

Figure 8:
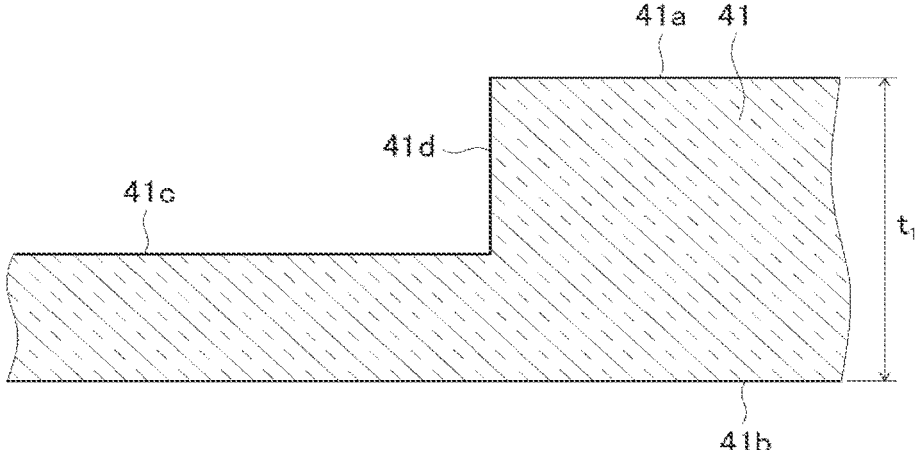
FIG. 8 is a cross-sectional diagram illustrating a glass sheet after polishing.
Figure 9:
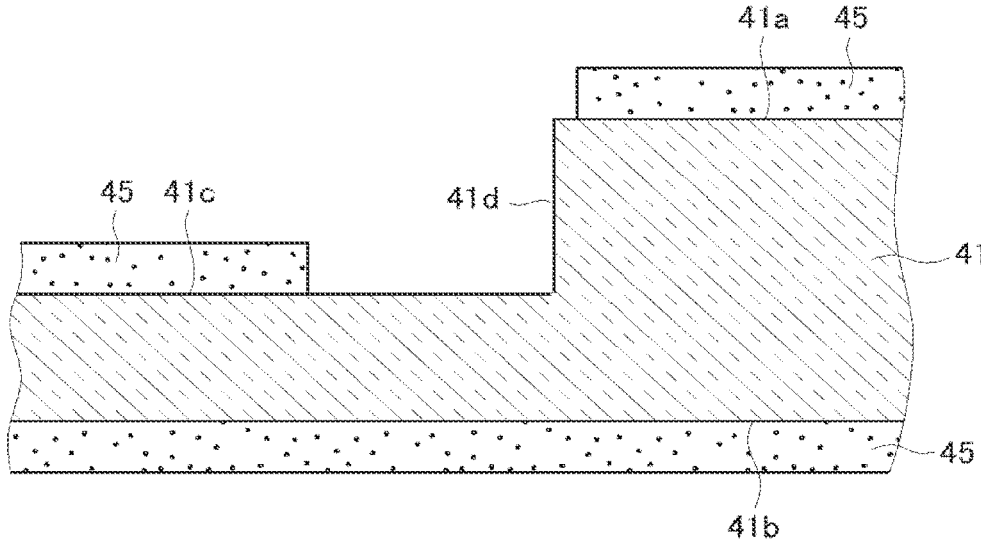
FIG. 9 is a cross-sectional diagram illustrating a glass sheet covered by a mask material.
Figure 10:
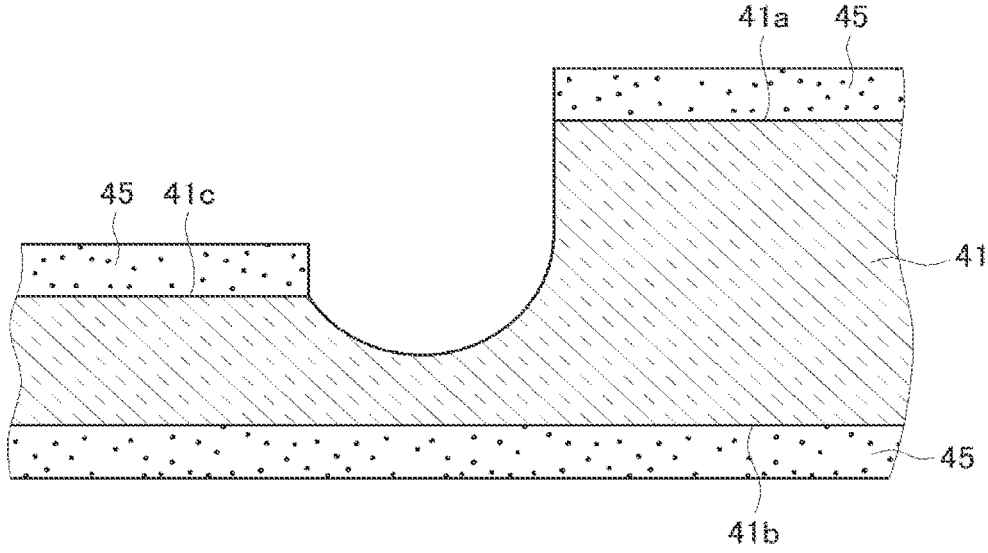
FIG. 10 is a cross-sectional diagram illustrating a glass sheet after etching.

The method for manufacturing the glass substrate 11 according to the second embodiment is described by referring to FIG. 8 to FIG. 10.

Since the process (preparation of glass sheet, chemical strengthening treatment, and chemical treatment) is the same as that in the first embodiment except for slimming, description thereof is omitted, and only slimming is described.

<<Slimming>>

The prepared glass sheet 41 is subjected to slimming. The slimming includes the below-described polishing, masking and etching.

(Polishing)

FIG. 8 is a cross-sectional diagram illustrating the glass sheet 41 after polishing.

As illustrated in FIG. 8, part of the glass sheet 41 is polished from the first main surface 41a toward the second main surface 41b to reduce the sheet thickness $t_1$. The portion serving as the thick portion 3 is left without being polished. As a result of the polishing, in the glass sheet 41, a polished surface 41c is formed at a position lower than the first main surface 41a. In addition, a polished end face 41d perpendicular to the first main surface 41a and the polished surface 41c is formed.

The method for polishing is not particularly limited, and a conventionally known polishing pad, etc. is appropriately used.

(Masking)

FIG. 9 is a cross-sectional diagram illustrating a glass sheet 41 covered by a mask material 45.

As illustrated in FIG. 9, the first main surface 41a, the second main surface 41b and the polished surface 41c of the glass sheet 41 are covered by a mask material 45.

More specifically, as illustrated in FIG. 9, out of the polished surface 41c, only a surface serving as the first main surface 2a of the thin portion 2 is covered by a mask material 45.

The first main surface 41a may be covered by the mask material 45 while exposing a surface of an end portion of the polished end face 41d.

As for the second main surface 41b, the entire surface is covered by the mask material 45.

(Etching)

FIG. 10 is a cross-sectional diagram illustrating the glass sheet 41 after etching.

The glass sheet 41 covered by the mask material 45 is etched using an etchant. Consequently, as illustrated in FIG. 10, part of the portion not covered by the mask material 45 in the glass sheet 41 dissolves in the etchant.

Dissolution gradually proceeds from part of the polished surface 41c, the polished end face 41d and part of the first main surface 41*a*, which are not covered by the mask material 45, toward the inside of the glass sheet 41. In this way, a portion serving as the connection portion 4 is formed. Because of etching using an etchant, a smooth etching surface (curved surface) is formed in the portion serving as the connection portion 4.

The portions maintained without being dissolved serve as the thin portion 2 and the thick portion 3.

Similarly to the first embodiment, as long as the above-described shape can be obtained, dry etching using, for example, a fluorine gas may also be employed.

After the etching, the mask material 45 is appropriately removed by a known method.

In the case of not applying the chemical strengthening treatment and the chemical treatment, the glass sheet 41 where the mask material 45 is removed after slimming serves as the glass substrate 11.

In the case of not applying the chemical treatment after the chemical strengthening treatment, the glass sheet 41 subjected to the chemical strengthening treatment serves as the glass substrate 11.

In the case of applying the chemical treatment after the chemical strengthening treatment, the glass sheet 41 subjected to the chemical treatment serves as the glass substrate 11.

EXAMPLES

The present invention is described more specifically below by referring to Examples. However, the present invention is not limited to the following Examples.

Ex. 1 to Ex. 7 are Working Examples, and Ex. 8 and Ex. 9 are Comparative Examples Ex. 1

The glass substrate 1 according to the first embodiment (see FIG. 1 to FIG. 6) was manufactured as described below.
<<Preparation of Glass Sheet>>
As the glass sheet 41, a glass for chemical strengthening ("Dragontrail" manufactured by AGC Inc.) of 1,200 mm×300 mm was prepared. The sheet thickness $t_1$ of the glass sheet 41 is the same as the sheet thickness $t_3$ (1.3 mm) of the thick portion 3 shown in Table 1 below.
<<Slimming>>
Slimming according to the first embodiment was performed. That is, the prepared glass sheet 41 was covered by a mask material 45 and etched using an etchant.

As the mask material 45, a film (acid-resistant) of a PET material coated with an acrylic pressure-sensitive adhesive was used.

As the etchant, an aqueous solution of 6 mass % hydrogen fluoride (HF) was used. The temperature of the etchant was set to 25° C. The etching time was set to 20 minutes.

After the etching, the mask material 45 was removed.
<<Chemical Strengthening Treatment>>
The glass sheet 41 after removing the mask material 45 was subjected to a chemical strengthening treatment. The chemical strengthening treatment was performed by immersing the glass sheet 41 in a $KNO_3$ molten salt at 435° ° C. for 60 minutes.

After the chemical strengthening treatment, the glass sheet 41 was washed with water.

In this way, a glass substrate 1 according to the first embodiment was obtained.

Ex. 2

In the slimming, the etching time was set to 15 minutes. In the chemical strengthening treatment, the glass sheet 41 was immersed in a $KNO_3$ molten salt at 410° C. for 30 minutes.

Except for these, a glass substrate 1 according to the first embodiment was obtained in the same manner as in Ex. 1.

Ex. 3

In the slimming, the etching time was set to 25 minutes.

Except for this, a glass substrate 1 according to the first embodiment was obtained in the same manner as in Ex. 1.

Ex. 4

The sheet thickness $t_1$ of the glass sheet 41 (the sheet thickness $t_3$ of the thick portion 3 shown in Table 1 below) was set to 2.0 mm.

In the slimming, the etching time was set to 35 minutes.

Except for these, a glass substrate 1 according to the first embodiment was obtained in the same manner as in Ex. 1.

Ex. 5

The glass substrate 11 according to the second embodiment (see FIG. 7 to FIG. 10) was manufactured as described below.
<<Preparation of Glass Sheet>>
As the glass sheet 41, a glass for chemical strengthening ("Dragontrail" manufactured by AGC Inc.) of 1,200 mm×300 mm was prepared. The sheet thickness $t_1$ of the glass sheet 41 is the same as the sheet thickness $t_3$ (1.3 mm) of the thick portion 3 shown in Table 1 below.
<<Slimming>>
Slimming according to the second embodiment was performed. That is, the prepared glass sheet 41 was first polished using a polishing pad, then covered by a mask material 45, and subsequently etched. This case is denoted as "present" in the column of "Etching Time" of "Slimming" of Table 1 below.

As the mask material 45, a film (acid-resistant) of a PET material coated with an acrylic pressure-sensitive adhesive was used.

As the etchant, an aqueous solution of 6 mass % hydrogen fluoride (HF) was used. The temperature of the etchant was set to 25° C. The etching time was set to the time until the sheet thickness $t_4$ of the connection portion 4 becomes 0.2 mm.

After the etching, the mask material 45 was removed.
<<Chemical Strengthening Treatment>>
The glass sheet 41 after removing the mask material 45 was subjected to a chemical strengthening treatment. The chemical strengthening treatment was performed by immersing the glass sheet 41 in a $KNO_3$ molten salt at 435° C. for 60 minutes.

After the chemical strengthening treatment, the glass sheet 41 was washed with water.

In this way, a glass substrate 11 according to the second embodiment was obtained.

Ex. 6

In the chemical strengthening treatment, the glass sheet 41 was immersed in a $KNO_3$ molten salt at 410° ° C. for 30 minutes.

Except for this, a glass substrate 1 according to the first embodiment was obtained in the same manner as in Ex. 1.

Ex. 7

In the chemical strengthening treatment, a molten salt containing $KNO_3$, further containing 6 mol % $K_2CO_3$, and having a Na concentration of 2,000 ppm by mass was used. This case is denoted as "$KNO_3$, etc." in the column of "Composition of Molten Salt" of "Chemical Strengthening Treatment" of Table 1 below.

Furthermore, a chemical treatment was applied to the glass sheet 41 subjected to the chemical strengthening treatment. Specifically, an acid treatment of immersing the glass sheet 41 in an acidic solution)(40° ° C. containing 6 mass % nitric acid for 2 minutes was performed. Subsequently, an alkali treatment of immersing the glass sheet 41 subjected to the acid treatment in a basic solution)(40° ° C. containing 4 mass % sodium hydroxide for 2 minutes was performed.

Except for these, a glass substrate 1 according to the first embodiment was obtained in the same manner as in Ex. 1.

Ex. 8

In the slimming, the etching time was set to 5 minutes.

Except for this, a glass substrate 1 according to the first embodiment was obtained in the same manner as in Ex. 1.

Ex. 8 is Comparative Example as indicated above but, for convenience, is referred to as "the glass substrate 1 according to the first embodiment".

Ex. 9

In the slimming, etching after the polishing was not performed. This case is denoted as "none" in the column of "Etching Time" of "Slimming" of Table 1 below.

Except for this, a glass substrate 11 according to the second embodiment was obtained in the same manner as in Ex. 5.

Ex. 9 is Comparative Example as indicated above but, for convenience, is referred to as "the glass substrate 11 according to the second embodiment".

Glass substrates 1 and glass substrates 11 obtained in Ex. 1 to Ex. 9 were determined for respective physical properties (characteristics).

Specifically, in the thin portion 2, the sheet thickness $t_2$, the compressive stress value (CS) and depth (DOL) of the compressive stress layer, the internal tensile stress (CT), and the limit bend radius were determined.

Also, in the thick portion 3, the sheet thickness $t_3$, the compressive stress value (CS) and depth (DOL) of the compressive stress layer, the internal tensile stress (CT), the surface strength, and the number of broken pieces were determined.

In addition, the ratio (thin portion/thick portion) between CT of the thin portion 2 and CT of the thick portion 3 was determined.

Furthermore, the curvature radius $r_1$ of the first connection surface 4a in the connection portion 4 was determined. In Ex. 5, the sheet thickness $t_4$ of the connection portion 4 was determined.

The curvature radius 12 of the overhang surface 5a of the overhang part 5 was also determined.

The results are shown in Table 1 below.

<Evaluation>

Using glass substrates 1 and glass substrates 11 of Ex. 1 to Ex. 9, the flexibility of the connection portion 4 was evaluated as follows.

Figure 12:
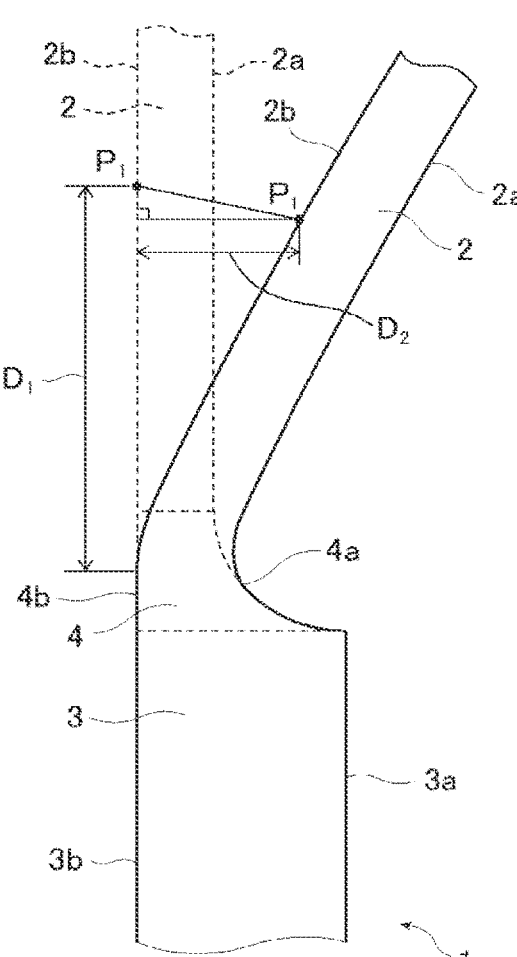
FIG. 12 is a cross-sectional diagram for explaining the evaluation method for flexibility of the connection portion.

FIG. 12 is a cross-sectional diagram for explaining the evaluation method for flexibility of the connection portion 4. Note that although FIG. 12 illustrates about the glass substrate 1, the same applies to the glass substrate 11.

First, a position spaced apart by a distance $D_1$ (=50 mm) from the connection portion 4 toward the thin portion 2 is designated as position $P_1$. More specifically, a position spaced apart by a distance $D_1$ (=50 mm) from the intermediate position of the second connection surface 4b of the connection portion 4 along the second connection surface 4b of the connection portion 4 and the second main surface 2b of the thin portion 2 is designated as portion $P_1$.

Then, while holding the thick portion 3, the thin portion 2 is bent toward the first main surface 2a side with the connection portion 4 as a fulcrum. At this time, a distance $D_2$ by which the position $P_1$ is displaced in the sheet thickness direction (a direction perpendicular to the distance $D_1$ direction) of the glass substrate 1 (glass substrate 11) was measured.

In Table 1 below, a case where the distance $D_2$ is less than 1.3 mm is rated as "C", a case where the distance $D_2$ is 1.3 mm or more and less than 2.5 mm is rated as "B", a case where the distance $D_2$ is 2.5 mm or more is rated as "A". In the case where the distance $D_2$ is 1.3 mm, the curvature radius of bend corresponds to 1,000 mm. In the case where the distance $D_2$ is 2.5 mm, the curvature radius of bend corresponds to 500 mm.

As the distance $D_2$ is longer, the connection portion 4 can be judged as more flexible.

TABLE 1

| | | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
| Slimming | Embodiment | 1st embodiment | 1st embodiment | 1st embodiment | 1st embodiment | 2nd embodiment | 1st embodiment | 1st embodiment | 1st embodiment | 2nd embodiment |
| | Etching time [min] | 20 | 15 | 25 | 35 | present | 20 | 20 | 5 | none |
| Chemical strengthening treatment | Composition of molten salt | $KNO_3$ | $KNO_3$ | $KNO_3$ | $KNO_3$ | $KNO_3$ | $KNO_3$ | $KNO_3$, etc. | $KNO_3$ | $KNO_3$ |
| | Temperature of molten salt [° C.] | 435 | 410 | 435 | 435 | 435 | 410 | 435 | 435 | 435 |
| | Immersion time [min] | 60 | 30 | 60 | 60 | 60 | 30 | 60 | 60 | 60 |
| Chemical treatment | | none | none | none | none | none | none | present | none | none |
| Thin portion | $t_2$ [mm] | 0.3 | 0.6 | 0.2 | 0.3 | 0.3 | 0.3 | 0.3 | 1.0 | 0.3 |
| | CS [MPa] | 774 | 791 | 771 | 774 | 774 | 774 | 774 | 774 | 774 |

TABLE 1-continued

|  |  | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|---|
|  | DOL [μm] | 25 | 25 | 25 | 25 | 25 | 14 | 25 | 25 | 25 |
|  | CT [MPa] | 77 | 36 | 129 | 77 | 77 | 40 | 77 | 20 | 77 |
|  | Limit bend radius [mm] | 30 | 45 | 15 | 30 | 30 | 30 | 25 | 100 | 30 |
| Thick portion | $t_3$ [mm] | 1.3 | 1.3 | 1.3 | 2.0 | 1.3 | 1.3 | 1.3 | 1.3 | 1.3 |
|  | CS [MPa] | 826 | 826 | 826 | 833 | 826 | 783 | 826 | 826 | 826 |
|  | DOL [μm] | 27 | 27 | 27 | 27 | 27 | 15 | 27 | 27 | 27 |
|  | CT [MPa] | 18 | 18 | 18 | 12 | 18 | 9 | 18 | 18 | 18 |
|  | Surface strength [kgf] | 300 | 300 | 300 | 480 | 300 | 300 | 450 | 300 | 300 |
| Difference in number density of broken pieces [pieces/(5 cm × 5 cm)] |  | 3.2 | 0.67 | 10.8 | 6.2 | 3.4 | 1.2 | — | 0.15 | — |
| Ratio of CT |  | 4.3 | 2.0 | 7.2 | 6.4 | 4.3 | 4.4 | 4.3 | 1.1 | 4.3 |
| Connection portion | $r_1$ [μm] | 748 | 403 | 821 | 748 | 748 | 748 | 748 | 210 | — |
|  | $t_4$ [mm] | — | — | — | — | 0.2 | — | — | — | 0.3 |
| Overhang part | $r_2$ [μm] | 120 | 0 | 150 | 170 | 120 | 120 | 120 | — | — |
| Rating |  | B | B | A | B | A | B | A | C | C |

<Summary of Evaluation Results>

As shown in Table 1, in the glass substrates 1 of Ex. 1 to Ex. 4, Ex. 6 and Ex. 7, the connection portion 4 was easily bent, compared with the glass substrate 1 of Ex. 8.

Also, in the glass substrate 11 of Ex. 5, the connection portion 4 was easily bent, compared with the glass substrate 11 of Ex. 9.

With respect to each of the glass substrate 1 of Ex. 1 and the glass substrate 11 of Ex. 5, the neighborhood of the center of the thin portion 2 was fractured by falling a ball, and propagation of a crack from the thin portion 2 to the thick portion 3 was confirmed.

Specifically, the number of cracks present at a position 5 mm toward the connection portion 4 and thin portion 2 side from the boundary line between the first connection surface 4a and the first main surface 3a, and the number of cracks present at a position 5 mm toward the thick portion 3 side from the boundary line between the first connection surface 4a and the first main surface 3a were compared.

As a result, in Ex. 1, per 30 cm length of the connection portion 4, the number of cracks on the thick portion 3 side was smaller by 3 than the number of cracks on the thin portion 2 side.

In Ex. 5, per 30 cm length of the connection portion 4, the number of cracks on the thick portion 3 side was smaller by 8 than the number of cracks on the thin portion 2 side.

In Ex. 1 and Ex. 5, it is presumed that because there is a clear difference in the number density of broken pieces, propagation of a crack from the thin portion 2 to the thick portion 3 was suppressed.

Furthermore, in Ex. 5, it is presumed that because the connection portion 4 is thinner than the thin portion 2, propagation of a crack is more suppressed.

While the invention has been described in detail and with reference to specific embodiments thereof, it will be apparent to one skilled in the art that various changes and modifications can be made therein without departing from the spirit and scope of the invention.

This application is a Divisional of U.S. application Ser. No. 17/646,793, filed Jan. 3, 2022, now pending; which is a Continuation of PCT/JP2020/024908, filed Jun. 24, 2020, now expired. This application is based on Japanese Patent Application No. 2019-128183 filed on Jul. 10, 2019. All of the above applications are incorporated herein by reference in their entireties.

REFERENCE SIGNS LIST

1: Glass substrate
2: Thin portion
2a: First main surface
2b: Second main surface
3: Thick portion
3a: First main surface
3b: Second main surface
4: Connection portion
4a: First connection surface
4b: Second connection surface
5: Overhang part
5a: Overhang surface
5b: Surface
11: Glass substrate
21: Uneven structure
31: Assembly
22: Display panel
23: Display panel
24: Display panel
25: Display panel
26: Panel holding section
41: Glass sheet
41a: First main surface
41b: Second main surface
41c: Polished surface
41d: Polished end face
45 Mask material
$r_1$: Curvature radius of first connection surface
$r_2$: Curvature radius of overhang surface
$t_1$: Sheet thickness of glass sheet
$t_2$: Sheet thickness of thin portion
$t_3$: Sheet thickness of thick portion
$t_4$: Sheet thickness of connection portion
$L_1$, $L_2$: Straight line
$W_1$, $W_2$: Length
$\theta_1$: Angle
$S_1$, $S_2$, $S_3$, $S_4$, $S_5$, $S_6$: Point
$P_1$: Position
$D_1$, $D_2$: Distance

The invention claimed is:

1. An assembly comprising:

an uneven structure;

a glass substrate that is assembled to the uneven structure; and two to four display panels, wherein the glass substrate comprises:

a thin portion having a first surface and a second surface opposed to the first surface;

a thick portion having a first surface and a second surface opposed to the first surface and having a sheet thickness t3 that is larger than a sheet thickness t2 of the thin portion; and a connection portion having a first connection surface and a second connection surface, the first connection surface connecting the first surface of the thin portion to the first surface of the thick portion, the second connection surface connecting the second surface of the thin portion to the second surface of the thick portion, wherein the uneven structure includes a recess and, in an assembled state, the glass substrate is elastically deformed such that the thin portion extends into the recess, wherein, in the assembled state, only the thin portion faces the recess, wherein at least a first of the display panels is disposed to face the thin portion, and at least a second of the display panels is disposed to face the thick portion, wherein in a state where the glass substrate is not elastically deformed, the second surface of the thin portion, the second connection surface of the connection portion, and the second surface of the thick portion lie flush with each other, and wherein the first connection surface has a curvature radius of more than or equal to 400 µm.

2. The assembly according to claim 1, wherein a sheet thickness t4 of the connection portion is less than or equal to 0.5 mm.

3. The assembly according to claim 1, wherein the sheet thickness t2 of the thin portion is 0.05 mm or more and 0.8 mm or less, and the sheet thickness t3 of the thick portion is 0.5 mm or more and 2.5 mm or less.

4. The assembly according to claim 1, wherein the connection portion comprises an overhang part.

5. The assembly according to claim 1, wherein the glass substrate is a chemically strengthened glass.

6. A method of manufacturing an assembly, the method comprising assembling the glass substrate as defined in claim 1 to an uneven structure, wherein the thin portion of the glass substrate is elastically deformed according to a shape of the uneven structure and assembled to the uneven structure.

7. An in-vehicle display device comprising:

an instrument cluster provided in front of a driving seat;

a center information display provided in front of an area between the driving seat and a passenger seat; and the glass substrate as defined in claim 1, wherein the instrument cluster comprises an uneven structure, wherein the thin portion of the glass substrate is assembled to the uneven structure with the thin portion elastically deformed according to a shape of the uneven structure, and wherein the thick portion of the glass substrate is assembled to the center information display.

8. A method of manufacturing an in-vehicle display, the method comprising assembling the glass substrate as defined in claim 1 to an instrument cluster provided in front of a driving seat and a center information display provided in front of an area between the driving seat and a passenger seat, wherein the instrument cluster comprises uneven structure, wherein the thin portion of the glass substrate is elastically deformed according to a shape of the uneven structure and assembled to the uneven structure, and wherein the thick portion of the glass substrate is assembled to the center information display.

* * * * *